United States Patent

[11] 3,551,587

| [72] | Inventor | Richard F. Propst |
| | | Pittsfield, Mass. |
| [21] | Appl. No. | 842,531 |
| [22] | Filed | July 17, 1969 |
| [45] | Patented | Dec. 29, 1970 |
| [73] | Assignee | General Electric Company |
| | | a corporation of New York. |

[54] INCLINED BUSHING FOR TRANSFORMERS AND RELATED DEVICES
8 Claims, 2 Drawing Figs.

[52] U.S. Cl. ............................................. 174/152, 174/37
[51] Int. Cl. ........................................... H01b 17/26
[50] Field of Search ........................................... 174/18, 37, 73, 75D, 152, 153; 339/60, 126, 143, 177

[56] References Cited
UNITED STATES PATENTS

| 1,777,072 | 9/1930 | Burnham | 174/18X |
| 3,344,391 | 9/1967 | Ruete | 174/73UX |
| 3,466,593 | 9/1969 | Arndt et al | 174/18UX |
| 3,469,223 | 9/1969 | Leonard | 174/152X |

FOREIGN PATENTS

| 589,343 | 12/1933 | Germany | 174/18 |
| 205,227 | 10/1923 | Great Britain | 174/153 |
| 969,480 | 9/1964 | Great Britain | 174/18 |

*Primary Examiner*—Laramie E. Askin
*Attorneys*—Francis X. Doyle, Vale P. Myles, Frank L. Neuhauser, Oscar B. Waddell and Joseph B. Forman ABSTRACT: A high voltage transformer bushing is provided with an angular body portion that causes the outermost end of the bushing to be inclined with respect to the top of a transformer through which the bushing is mounted in operation. The resultant inclined bushing arrangement is particularly useful on transformers mounted in subterranean vaults to which high voltage electric power is supplied through a cable that terminates in a conductor termination module that is adapted to be manually connected to the inclined transformer bushing. The inclined bushing makes it convenient for a lineman to connect or disconnect the cable termination while standing back from the transformer vault cover in a safe position from which he can manipulate the cable termination with a lineman's hotstick.

Inventor,
Richard F. Propst,
by Vale P. Myles
His Attorney.

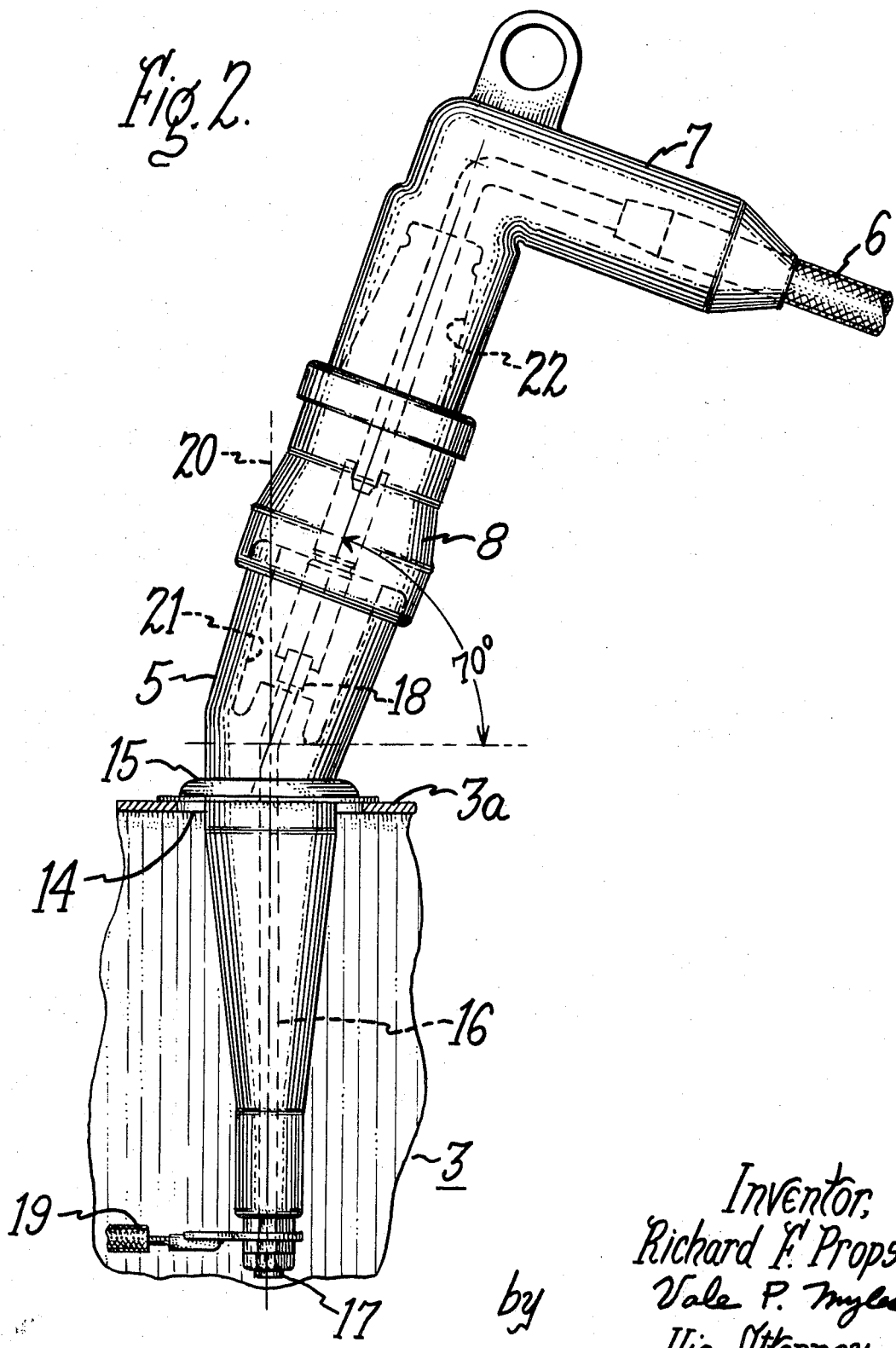

INCLINED BUSHING FOR TRANSFORMERS AND RELATED DEVICES

In recent years there has been a rapidly growing trend toward placing electric power distribution systems completely underground, so that the component parts of the systems, such as transformers, circuit breakers and the connecting cable used to distribute power, are completely hidden from view so that they do not interfere with the natural landscape through which the systems must pass. Although underground power distribution systems have been in use for many years, particularly in urban areas where the costs inherent in use of above-surface space forced early consideration and adoption of extensive underground distribution systems, the last 5 or 6 years have seen a particularly rapid development of many new component parts specifically designed for underground electrical systems. Prior to that time, there was not sufficient volume of underground component business to warrant designing special component parts for underground applications that differed substantially from the type of component parts used in aboveground distribution systems. However, as more underground distribution systems were placed in service the desirability of using custom designed underground component parts for such systems became apparent to meet the special problems presented by such systems which were not present in aboveground distribution systems.

One such relatively recent significant development in underground electrical system components was the development of modular conductor connecting means to replace the prior art technique of splicing conductors together by manually crimping the metal parts and hand winding insulating tape around the junction. As the use of such modular connector arrangements expanded, numerous inventions were developed to provide improvements over prior art system components thereby to enable safer, more convenient handling of the components during normal maintenance and repair operations. A significant problem that remained unsolved prior to the present invention was that bushings used on prior art underground, vault mounted transformers required a lineman to stand directly over the transformer vault while connecting a cable termination module to or disconnecting it from the vertically aligned transformer bushing. The need for a lineman to position himself directly over the vault during a cable connecting or disconnecting operation has two main disadvantages. First, the size of the transformer vault frequently makes it difficult for a lineman to obtain a secure footing while straddling the vault to make the cable connection, therefore, he has a tendency either to slam the cable termination against the transformer bushing with too great a force, which may damage either of these component parts, or to hesitate in closing the cable on the bushing so that undesirably prolonged arcing may occur between these component parts, thus increasing wear thereof by arc erosion. Secondly, such a stance by a lineman during a cable connecting operation exposes him to possible injury if a defective module happens to be closed in on a faulted circuit which might develop an explosive arc causing fragments of termination components to be hurled against the exposed lineman.

A primary object of the present invention is to provide a unique bushing for vault-mounted electrical apparatus, such as a transformer, that will overcome the foregoing problems.

Another object of the invention is to provide a transformer bushing having a contact entrance recess at its outer end that is inclined with respect to the main longitudinal axis of the bushing so that a cable termination module can be connected to the bushing by approaching it at a predetermined angle with respect to the generally horizontal upper surface of a buried transformer on which the bushing is mounted.

A further object of the invention is to provide an angled transformer bushing that is rugged in construction and hermetically sealed around an electrical conductor extending through it.

Still another object of the invention is to provide an underground distribution transformer with an angular high voltage bushing that affords safer and more convenient access for a lineman attempting to couple a cable termination module to the bushing.

Further advantages and additional objects of the invention will become apparent from the description that follows taken in conjunction with the drawings in which:

FIG. 2 is a side elevation view of the preferred form of the invention illustrated in FIG. 1, partly in cross section and partly in phantom, showing unique characteristic features of the invention.

Figure 1:
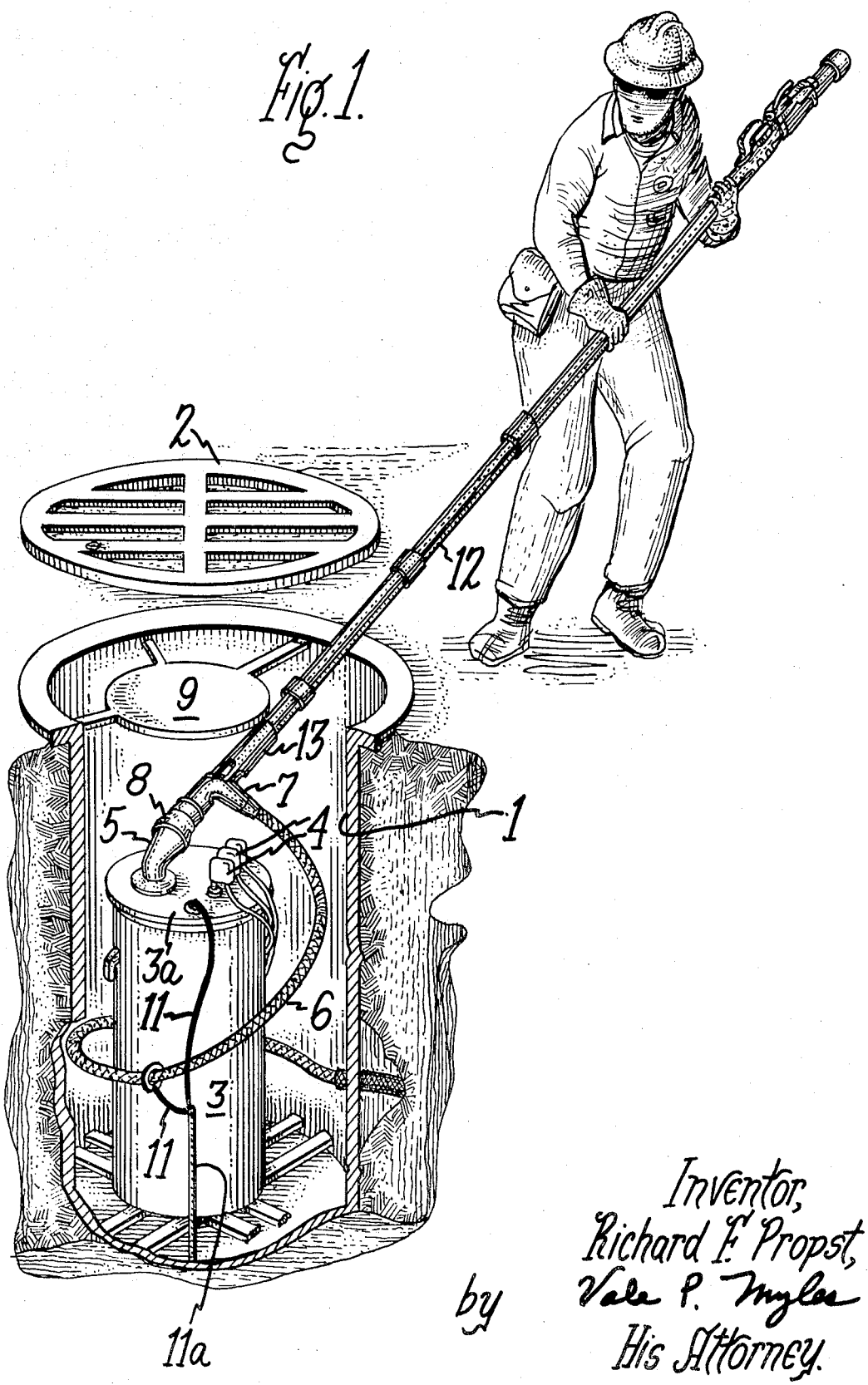
FIG. 1 is a perspective view, partly in cross section, of a subterranean transformer embodying a preferred form of the present invention which is shown with respect to a cable termination module mounted on a lineman's hotstick for convenient manipulation.

Referring now to FIG. 1 of the drawing, there is shown a conventional distribution transformer vault 1 that is buried in the ground so that its uppermost surface is substantially flush with the surface of the surrounding terrain. A grilled cover 2 is provided for closing the top of the vault so that normal surface traffic can continue to use the area above the vault. Within the vault 1 is mounted a distribution transformer 3 having a plurality of low voltage bushings 4 and a high voltage bushing 5 mounted on its upper surface. It will be understood by those skilled in the art that the respective bushings 4 and 5 are, respectively, electrically connected to the primary and secondary windings of the transformer. Transformer 3 is electrically connected to a source of power by a shielded cable 6 which is terminated in a modular cable termination 7 that is adapted to be joined in water tight relation with a load break module 8 coupled to the bushing 5.

A protective baffle 9 is supported in position above transformer 3 to prevent obstacles such as rocks from falling through the grating of cover 2 onto the bushings 4 and 5 mounted on transformer 3, and to prevent unauthorized people from having access to the connectors. Cable 6 and transformer 3 are electrically grounded by conductors 11 and ground rod 11a. In FIG. 1, transformer 3 is depicted as being connected radially to a distribution system in which it forms the last high voltage link on a particular spur of the system. As is well known, if desired, the transformer 3 can be connected in a loop system by simply providing an additional bushing on the cover of the transformer so that power can be fed through the transformer to outgoing cable. Or a Tee-Tap connector could be utilized in the vault and the transformer effectively served by a single cable tapped off of the loop.

In order for a lineman to electrically connect cable termination module 7 to the bushing 5 through load break device 8, it is conventional practice to mount the termination 7 on a hotstick 12, as shown in FIG. 1. The jaws 13 on hotstick 12 are adjustable so that the termination 7 can be firmly clamped therein to prevent any relative motion with respect to the hotstick 12 during the contact opening or closing movement of the termination 7 by the lineman. In order to more fully explain the unique features of applicant's invention, reference is now made to FIG. 2 of the drawing.

In FIG. 2, like reference numerals are used to designate parts similar to those shown in FIG. 1, thus, there is shown a portion of transformer housing 3a having an aperture 14 therein through which bushing 5 is disposed. In the preferred embodiment of the invention, the bushing 5 is provided with an an embedded steel flange 15 which is welded or otherwise suitably affixed to the surface area of transformer housing 3a around the aperture 14, to form a seal therewith. A rodlike conductor 16 (shown in phantom) extends from one end to the other of bushing 5 terminating in a threaded contact portion 17 at its lowermost end and terminating in a plug-in-type contact 18 at its outermost end. A lead 19 from the high voltage winding of the transformer 3 is connected to contact 17.

In order to provide a load make and load break function for use with termination module 7, in conjunction with the bushing 5 there is provided a switching module 8 mounted in bushing 5 in watertight, voltage-grading relationship therewith.

The operating mechanism of switching module 8 can be similar to that described in detail in copending Application, Ser. No. 707,779, filed Feb. 23, 1968 and assigned to the assignee of the present invention. Of course, other suitable switching means can also be utilized, or a direct a coupling function can be performed without any switching means being provided if desired in given applications. For purposes of explaining the present invention, it is only necessary to realize that module 8 is provided with a shaped surface shown in phantom extending into recess 21 of bushing 5 and formed to essentially complement that recess surface, so that a watertight seal is formed between the bushing 5 and switch module 8 when these component parts are in their respective operating positions, as shown in FIG. 2. In like manner, module 8 has a second integral sealing surface shown in phantom at 22 which substantially complements the recessed surface in cable termination module 7 to again form a watertight, voltage graded seal between these component parts of the system when they are in assembled position as shown in FIG. 2.

In the preferred form of the invention modules 7 and 8 are formed of a conventional moldable rubber insulating material of any suitable type commonly used in present-day underground distribution systems. The bushing 5 is preferably formed of a high impact, thermal setting epoxy resin or other suitable plastic material that can withstand the mechanical shock of repeated closing operations of the termination module 7 with the contacts in module 8 or bushing 5. It is also important that the plastic material chosen for bushing 5 form and retain uniform insulated seal around conductor 16 over its entire length, including the angled portion thereof.

FIG. 2 clearly illustrated illustrates a major feature of novelty of the present invention; namely, the fact that bushing 5 and its embedded conductor 16 comprise a first relatively straight portion protruding inwardly from the housing 3a and a second relatively straight portion protruding outwardly from the housing 3a at an acute angle with respect to a hypothetical plane 20 drawn through the center of aperture 14 and extending approximately perpendicular to the surface of housing 3a adjacent the aperture 14. In the preferred embodiment of the invention, this acute angle falls in a range from 15° to 30° but for particular applications it may vary from between 10° and 55°.

Novel angular bushing 5 makes it possible for a lineman to stand a safe distance back from the edge of vault 1, in the manner shown in FIG. 1, while moving cable termination 7 into, or out of, contact with the switching module 8 extending from the angled bushing 5 at an inclined angle with respect to the top surface of transformer 3. Thus, it is possible for the lineman to secure a firm footing from which he can conveniently manipulate the termination 7 and its attached cable 6. Also, it is important to note that in this relatively safe position the lineman is protected from flying debris if termination 7 happens to be closed on switching module 8 when there is a fault on the system which could cause an explosive arc to be developed at the junctions of bushing 5, module 8 and termination 7.

It will be noted that with the angular bushing 5 of the invention, protective plate 9 can be left substantially in its normal operating position when connecting cable termination 7 to the contact 18 of bushing 5 (through module 8), thus the plate 9 also serves to deflect any flying debris, resulting from any high-current arc explosion, back into the vault 1, rather than allowing it to fly outward toward the lineman. In the preferred form of the invention, angular bushing 5 is shaped as a truncated cone with the large diameter end thereof extending outward from housing 3a while the small diameter end thereof extends inward from housing 3a. This arrangement provides a large diameter recess 21 that is capable of accommodating either a switch module 8 or a direct coupled cable termination having a suitable interface to complement the bushing recess surface 21 in watertight relation with respect thereto. At the same time, the enlarged diameter end of bushing 5 provides adequate strength to withstand the mechanical shocks applied to it by mechanical opening and closing operations of cable termination 7 with respect to the contacts of module 8 and bushing 5. Moreover, the integrally molded angular body of bushing 5 around bent conductor 16 provides a uniform, watertight seal for the conductor 16 that is not subject to formation of latent thermal stress lines that will cause cracks to form in the bushing 5 when it is temperature cycled during normal operating conditions. Therefore, an electrically and mechanically strong bushing 5 is formed to afford the unique safety and convenience advantages inherent in the novel structure disclosed by the applicant.

It will be apparent to those skilled in the art that the disclosed novel angular bushing of the invention can be modified for use with electrical devices other than the transformer 3 illustrated in FIG. 1. For example, such bushings may find extensive use on underground circuit breakers or feed-through bushing arrangements and it is the intent of the applicant to encompass all such applications of his invention within the scope of the following claims.

I claim:

1. A high voltage device that is adapted to be operatively mounted in an underground vault that restricts access to the device to its uppermost side, a protective housing disposed around said device, means defining an aperture in said housing, an elongated bushing of insulating material mounted in said aperture so that a first insulated portion of the bushing protrudes toward the inside of the housing and a second portion of the bushing protrudes toward the outside of the housing, a part of the longitudinal axis of said second portion being arranged to define an acute angle with a hypothetical plane through the center of said aperture parallel to the first portion of the bushing and substantially perpendicular to the housing adjacent the aperture, an electrical conductor extending through said insulating bushing, electrical circuit means connected between said conductor and said device, and electrical contact means on said conductor adjacent the outer end of said second portion of the bushing to afford means for releasably connecting a second contact to the conductor, said second portion of the bushing having a generally frustoconical configuration with the large diameter end thereof at the outer end of the bushing, said first portion of the bushing having an outer diameter that is substantially smaller over a major portion of its length than the largest diameter of said second portion of the bushing, whereby optimum electrical strength insulation is provided by a desirably lightweight layer of insulating material over a major portion of the length of said conductor and the bushing is made structurally strong enough to withstand mechanical shocks applied to it when a second contact is moved rapidly into engagement with the contact means on said conductor, and an annular steel flange embedded in said bushing in watertight relationship therewith at a point thereon adjacent the junction of said first and second portions of the bushing, said flange being mounted in sealing relationship to the housing around said aperture thereby to afford a mechanically strong support for said bushing that effectively maintains said second portion in position with its longitudinal axis defining said acute angle when the bushing is subjected to a said contact-engaging mechanical shocks, the angled arrangement of said outer end of the second portion of the bushing being effective to afford convenient access to the bushing to facilitate a rapid, snap-action connection of a second electrical contact to said electrical contact means when said second electrical contact is moved with a continuous contact-closing motion directly into engagement with said contact means, whereby such a connection can be made safely while said conductor and circuit means are electrically energized.

2. An invention as defined in claim 1 wherein said acute angle is greater than 10° and less than 55°.

3. An invention as defined in claim 2 wherein said acute angle is in a range of 15° to 35°.

4. The invention defined in claim 1 wherein a second part of the longitudinal axis of said second portion of the bushing is in substantial alignment with the longitudinal axis of said first portion of the bushing.

5. An invention as defined in claim 1 wherein said conductor comprises a metal rod and said bushing is generally frustoconical in shape, having its maximum diameter near the outermost end of said second portion thereof, and wherein said first portion of the bushing has a generally conical outer surface concentric with a major portion of the length of said conductor thereby to afford a voltage stress cone that extends from the innermost, smaller diameter end of said first portion to a point thereon adjacent said housing.

6. An invention as defined in claim 1 including means defining a conically tapered recess in the maximum diameter end of said bushing around the conductor, the side walls of said recess being adapted to surround said contact means and form a watertight seal around said second contact when said contact means is in engagement therewith.

7. An invention as defined in claim 6 in combination with a voltage-grading, electrically shielded conductor termination, said termination having a conductor therein electrically connected to said second contact, and a surface on said termination adjacent said second contact that complements the walls of said recess to form a watertight seal therewith when said second contact is in operating engagement with said electrical contact means.

8. The invention defined in claim 6 wherein said bushing is formed of high-impact resistant, thermal setting epoxy resin.